O. F. MILLER.
SPRING WHEEL.
APPLICATION FILED NOV. 29, 1913.
1,112,309.
Patented Sept. 29, 1914.
2 SHEETS—SHEET 1.
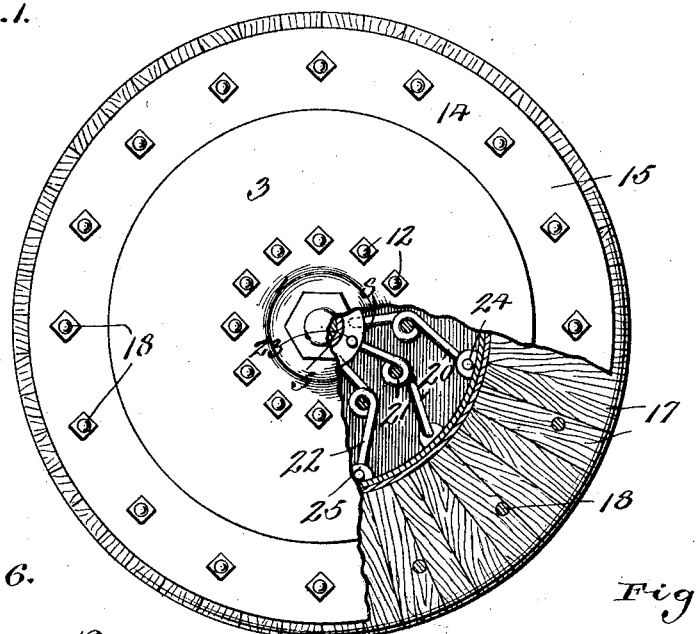
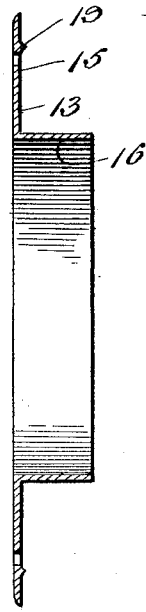
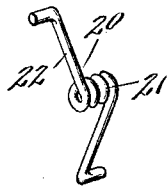
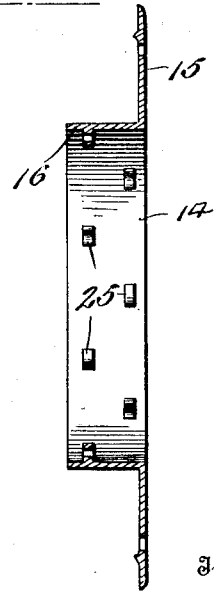
Inventor
O. F. Miller,
By Victor J. Evans
Attorney
Witnesses

O. F. MILLER.
SPRING WHEEL.
APPLICATION FILED NOV. 29, 1913.

1,112,309.

Patented Sept. 29, 1914.
2 SHEETS—SHEET 2.

Witnesses

Inventor
O. F. Miller,
By Victor J. Evans
Attorney

UNITED STATES PATENT OFFICE.

OSCAR F. MILLER, OF NEW MILFORD, PENNSYLVANIA.

SPRING-WHEEL.

1,112,309.     Specification of Letters Patent.     Patented Sept. 29, 1914.

Application filed November 29, 1913. Serial No. 803,764.

*To all whom it may concern:*

Be it known that I, OSCAR F. MILLER, a citizen of the United States, residing at New Milford, in the county of Susquehanna and State of Pennsylvania, have invented new and useful Improvements in Spring-Wheels, of which the following is a specification.

The invention relates to a spring wheel wherein the tire supporting rim is movably mounted with relation to the hub and supported from the latter by interposed spring members.

The main object of the present invention is the provision of a spring wheel in which the tire bearing rim is connected to the hub by means of spring members having remote yielding terminals connected respectively to the hub and rim and an intermediate support fixed with relation to the hub, the terminals of the spring members projecting from a fixed support of such member at opposing angles.

The invention in its preferred form of details will be described in the following specification, reference being had particularly to the accompanying drawings, in which:—

Figure 2:
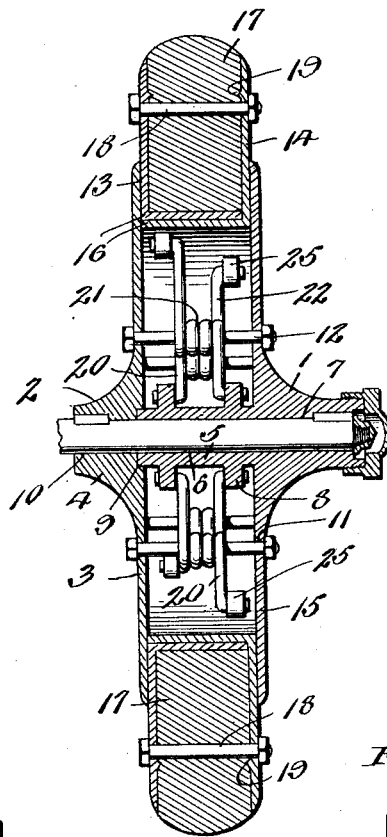
Figure 4:
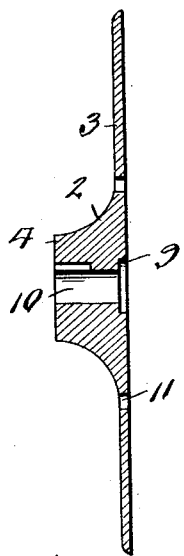
Figure 5:
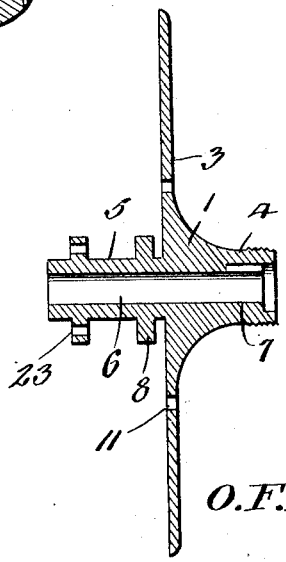

Figure 1 is a view in elevation of the improved wheel, portions being broken away. Fig. 2 is a vertical central section of the same. Fig. 3 is a perspective of one of the spring members. Fig. 4 is a vertical section of one of the hub plates. Fig. 5 is a vertical section of the opposing hub plate. Fig. 6 is a vertical section of one of the rim members. Fig. 7 is a vertical section of the opposing rim member.

Referring particularly to the accompanying drawings, the improved wheel comprises what I term hub plates 1 and 2, each including a circular plate section 3 and a hub extension 4 formed on the outer side thereof. The hub plate 1 is formed on the inner side of the plate section 3 with a sleeve projection 5 having the longitudinal opening 6 therein coincident with the opening 7 in the hub portion. The sleeve extension 5 is formed with spaced annular flanges 8, and the inner surface of the member 2 is formed with a depression 9 concentric with the axle opening 10 therein to receive the end of the sleeve extension when the parts are in connected relation. The members 1 and 2 are formed immediately beyond the hub projection 4 thereof with an annular series of openings 11, for a purpose which will later appear.

The plate members 1 and 2 are held in connected hub forming relation by bolts 12 passed through the alined openings 11 of said members and secured beyond the plate sections 3, securing the members 1 and 2 to form a completed hub portion with the plates 3 thereof held in spaced parallel relation and the respective flanges 8 equally spaced from the adjacent inner surface of such hub sections.

The rim member of the improved wheel which is designed to be movably mounted with relation to the hub member, comprises practically duplicate sections 13 and 14, each of which includes an annular plate 15 having a laterally projecting flange portion 16 arranged at right angles thereto at the inner circular edge. The two members 13 and 14 are so constructed that when associated in ring forming relation, the flange 16 of the member 13 overlies and bears upon the flange 16 of the member 14, in which position the plate sections 15 are arranged in spaced parallel relation and have a maximum transverse dimension corresponding approximately, to the transverse dimension between the inner surfaces of the plate members 3 of the hub section. The tread element of the wheel preferably comprises a series of blocks 17 secured between the plate sections 15 of the respective rim members, the opposing surface of the respective blocks being on lines exactly radial of the wheel and said blocks being secured in place by bolts 18 passing through the plate portions 15, said plate portions being if desired, formed with inwardly projecting spurs 19 to assist in securing the blocks in place. The outer edges of the blocks are preferably disposed with their grain ends outwardly, may if desired be provided with an annular tread element or may be rounded as shown to provide a tread element in themselves. As thus constructed, the rim members is mounted for free radial movement between the plates of the hub section, and as a connecting means, I employ spring elements 20 comprising spring sections centrally coiled at 21 and having the terminals 22 projecting from the coils in relative angular relation. The free ends of the inner terminals of each spring member are bent laterally and secured in openings 23 formed in one of the flanges 8, the coils of the members being mounted upon the bolts 12. The free ends of the outer terminals of the spring members are bent laterally and secured in openings 24 formed in projections 25 extending inwardly from the inner surface of the flange 16 of the rim member 14. The inner terminals of the alternate springs are secured to opposing flanges, and the projections 25 are arranged in annular rows with each projection offset with relation to the adjacent projections of the other row.

The construction insures that in normal position the connections of the respective terminals of any spring member are in line radially of the wheel, while the mounting of that member, that is the bolt 12, is offset from such line. This insures an effective spring action of the member in a load sustaining position of the wheel and as will be obvious from Fig. 1 of the drawings, clearly distributes this load to all of the spring members. The improved wheel provides an extremely resilient structure, which may effectively substitute the usual pneumatic type and in which the parts are so constructed and arranged as to permit the ready renewal of any particular part with a minimum of expense and labor.

What is claimed is:—

1. A wheel comprising a hub section including members each formed to provide a plate portion and a hub portion, one of the members having an inwardly projecting sleeve extension formed with spaced annular ribs, bolts securing the members together, a bearing member mounted for radial movement between the plate portions, coil springs mounted on the securing bolts and terminally connected to the ribs on the sleeves and to the bearing members.

2. A wheel comprising a hub section including members each formed to provide a plate portion and a hub portion, one of the members having an inwardly projecting sleeve extension formed with spaced annular ribs, bolts securing the members together, a bearing member mounted for radial movement between the plate portions, coil springs mounted on the securing bolts and terminally connected to the ribs on the sleeves and to the bearing members, the alternate springs being secured to opposing ribs.

In testimony whereof I affix my signature in presence of two witnesses.

OSCAR F. MILLER.

Witnesses:
LEROY W. BRUNDAGE,
JOHN C. KAUFER.

---

"Copies of this patent may be obtained for five cents each, by addressing the "Commissioner of Patents, Washington, D. C.""